June 8, 1926.

C. O. BRITTON

FIGURE TOY

Filed Sept. 22, 1922

1,588,006

Inventor

C. O. BRITTON,

By Chas. J. Williamson

Attorney

Patented June 8, 1926.

1,588,006

UNITED STATES PATENT OFFICE.

CLAUDE O. BRITTON, OF AURORA, ILLINOIS.

FIGURE TOY.

Application filed September 22, 1922. Serial No. 589,807.

My invention relates to toys, my object being to provide in an inexpensive form an attractive toy, and my invention consists in whatever is described by or included within the terms or scope of the appended claim. Briefly described my invention comprehends movable objects or figures, such for example as the figure of a mouse and that of a cat which have paths of movement that intersect so that at a certain point in the travel of say the mouse, the cat will spring at the mouse and appear to pounce upon the mouse, the movement of the cat being produced by a spring when a latch which restrains the action of the spring is released by the movement of the mouse.

In the annexed drawings which illustrate the figures of those of cat and mouse:

Figure 1:
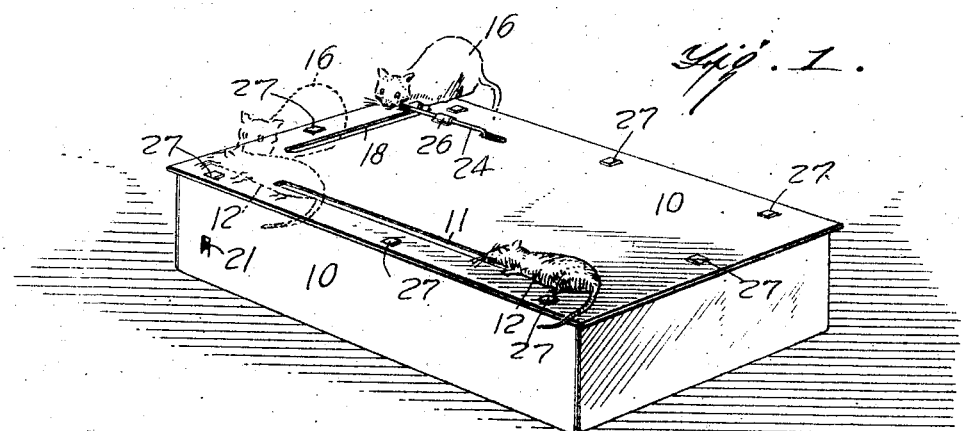
Fig. 1 is a perspective view showing the position of the parts before the movement of the mouse begins, the dotted lines showing their position when the cat has pounced upon the mouse.
Figure 2:
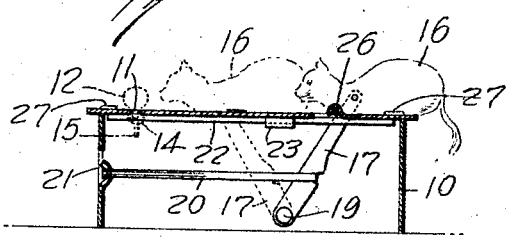
Fig. 2 is a cross section.
Figure 3:
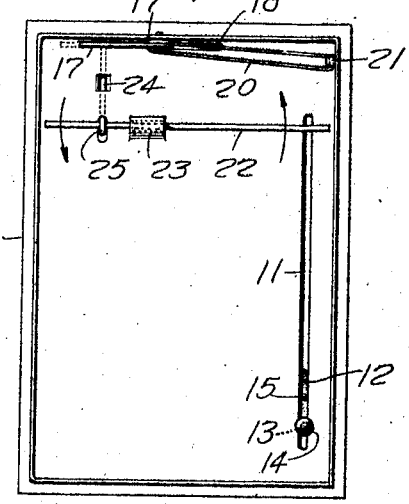
Fig. 3 is a bottom plan view.

Referring now in detail to what is shown in the drawings there is a base, 10, of oblong form and say two and one half inches long and one and three fourth inches wide, and which is hollow or box-like and made of sheet metal although of course the form of the base its dimensions and the material of which it is made may be greatly varied without departure from the principle of my invention. The base has a flat top and extending lengthwise of the top close to one side of the base is a slot, 11, to allow the longitudinal sliding movement of the mouse figure, 12, which rests upon the top over the slot and which is held in place by a stud or pin, 13, which passes from the bottom of the figure through the slot and on the underside of the latter has a head or enlargement, 14, to hold the figure in the slot while leaving it free to move back and forth over the same. Also projecting from the mouse figure downward through the slot is a pin, 15, which is sufficiently spaced from the retaining stud or pin as to form with the latter a guiding means for the mouse figure which will prevent its substantial lateral displacement by a turning movement, a slight sidewise oscillating movement which the size of the pin with reference to the slot will permit not being objectionable but desirable in order that the movements of the mouse may not be rigidly confined to a straight line. Indeed the slot, 11, instead of being straight might be made sinuous in order to permit the mouse figure to move in a devious path and towards the cat figure, 16, which is mounted to move cross-wise of the base and the path of the mouse figure so that at the appointed time the cat figure may move when the mouse figure is in a position for the cat figure seemingly to pounce upon it.

The cat figure is pivoted to the upper end of a lever, 17, which passes downward through a slot, 18, in the base, 10, that extends transversely thereof near one end and within the base on the end wall thereto by a pivot pin, 19. A spring device which may be a rubber band, 20, engages at one end the cat carrying lever, 19, and at the other end is attached at one end to the base so that it tends to swing the lever to move the cat in a direction towards the path of the mouse figure. When the base is made of sheet metal the side wall to which the spring is attached may have a tongue or spur, 21, struck up from it over which the end of the band or spring is caught. A latch device is provided to engage the cat carrying lever when the cat is in the position from which it jumps, which latch is released by contact therewith or a member thereof of the mouse figure guiding pin, 15, when the mouse has been moved to the position where the cat is to pounce upon it. Said latch device comprises a lever, 22, which may be a piece of heavy wire that extends transversely of the base, 10, on the underside of the top thereof to which it is pivoted for horizontal movement by being loosely engaged by a tongue or spur, 23, struck up from the base top when made of sheet metal and which is crimped or bent over the wire. Operatively connected with the lever, 22, is a latch finger, 24, which may be a piece of wire which at one end has an eye, 25, that extends downward through a slot in the base-top through which the lever is passed, and which has a straight portion on the top of the base piece that extends towards the slot in such top in which the mouse carrying lever swings, said latch finger being held in place and guided by a lug, 26, struck up from the base-top. The latch finger projects enough above the surface of the base-top so that it may be engaged by the finger to move it into position to latch the cat carrying lever. If desired the latch operating lever, 22, might have an extension of such length and in such position as to be engaged by either of the mouse figure guiding pins when the mouse is retracted to its position furthest from the cat and thereby the latch finger be automatically moved into latching position.

Figure 4:
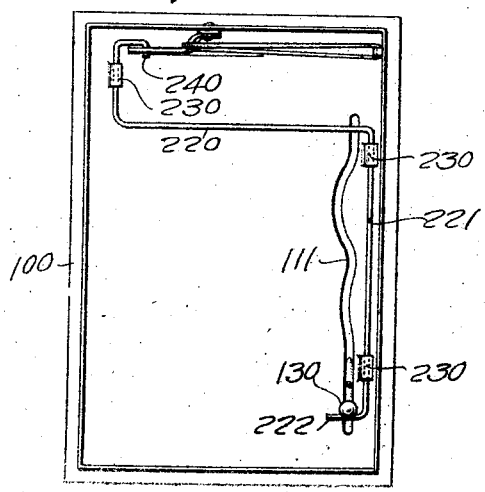
Fig. 4 is a bottom plan view illustrating another embodiment of my invention.

Indeed a single piece of wire may be so bent as to comprise both the latching finger and the means for moving it into and out of lever engaging position, as shown in Fig. 4. The latch finger, 240, is formed by a reverse bend of a transversely extending part, 220, corresponding to the releasing lever, 22, and from such part is an extension, 221, parallel with the mouse figure slot and at the far end of the path of such figure is bent at right angles to form a finger, 222, adapted to be engaged by the mouse guiding pin, 15. At intervals guide eyes, 230, are struck from the underside of the base-top piece to support and guide the movements of the latch device and thus formed all parts of it may be on the under side of said top piece.

The base piece when made of sheet metal may have the end walls integral with the top and bent downward therefrom and the side walls may be united to the base top and the end walls by the well known expedient of tongues, 27, formed on the side walls and slits in the top piece through which the tongues are passed and then bent over.

The manner of use of my toy will be evident from the description thus far given. With the mouse in a position away from the path of movement of the cat, the latter will be latched in its position farthest from the path of the mouse. The mouse is then pushed along towards the path of the cat but finally reaching a point where the cat latch will be released, the cat will suddenly jump over towards the mouse and pounce upon the mouse. The movement of the cat figure is arrested just before any part of the cat figure can strike the mouse figure in order to avoid possible damage to one by the other from their contact. My toy is calculated to afford much amusement or pleasure, especially to children, and it has such construction that a child can easily work it, yet it is capable of inexpensive manufacture and sale and is not apt to be readily damaged or broken in use.

What I claim is:

A toy comprising a base, slots extending respectively lengthwise and crosswise of the base, a movable figure mounted above each slot, a lever extending from one of the figures through one of the slots, a spring acting on said lever, a latch to engage said lever, a latch operating member on the underside of the base and a pin projecting from the figure not connected with the lever and passing through the slot beneath such figure and adapted to engage said latch releasing member.

In testimony whereof I hereunto affix my signature.

CLAUDE O. BRITTON.